US012755006B2

(12) United States Patent
Vigilant et al.

(10) Patent No.: US 12,755,006 B2
(45) Date of Patent: Oct. 6, 2026

(54) METHOD FOR SECURING AGAINST FAULT ATTACKS A VERIFICATION ALGORITHM OF A DIGITAL SIGNATURE OF A MESSAGE

(71) Applicant: THALES DIS FRANCE SAS, Meudon (FR)

(72) Inventors: David Vigilant, Meudon (FR); Xun Li, Meudon (FR); Sami Hokuni, Meudon (FR); Janne Rantala, Meudon (FR)

(73) Assignee: THALES DIS FRANCE SAS, Meudon (FR)

(*) Notice: Subject to any disclaimer, the term of this patent is extended or adjusted under 35 U.S.C. 154(b) by 573 days.

(21) Appl. No.: 17/612,295

(22) PCT Filed: Apr. 7, 2020

(86) PCT No.: PCT/EP2020/059935
§ 371 (c)(1),
(2) Date: Nov. 18, 2021

(87) PCT Pub. No.: WO2020/233892
PCT Pub. Date: Nov. 26, 2020

(65) Prior Publication Data
US 2022/0237287 A1 Jul. 28, 2022

(30) Foreign Application Priority Data
May 23, 2019 (EP) .................................... 19305651

(51) Int. Cl.
*G06F 21/55* (2013.01)
*G06F 21/64* (2013.01)

(52) U.S. Cl.
CPC ............ *G06F 21/554* (2013.01); *G06F 21/64* (2013.01); *G06F 2221/034* (2013.01)

(58) Field of Classification Search
CPC ... G06F 21/554; G06F 21/64; G06F 2221/034
See application file for complete search history.

(56) References Cited

U.S. PATENT DOCUMENTS 6,965,673 B1 * 11/2005 Boneh ..................... H04L 9/302 380/1
8,817,974 B2 * 8/2014 Schaffer .................. G06F 7/724 380/28

(Continued)

FOREIGN PATENT DOCUMENTS

DE 10161137 B4 * 2/2008 ............. G06F 7/725
WO WO-2018148819 A1 * 8/2018 ............... G09C 1/00

OTHER PUBLICATIONS

International Search Report (PCT/ISA/210) and Written Opinion (PCT/ISA/237) mailed on Apr. 30, 2020, by the European Patent Office as the International Searching Authority for International Application No. PCT/EP2020/059935 (WO2020/233892)—[16 pages].

(Continued)

*Primary Examiner* — Jorge L Ortiz Criado
*Assistant Examiner* — Gita Faramarzi

(57) ABSTRACT

Provided is a method for securing against fault attacks during verification a digital signature of a message on a client device. It performs (S1) at least one check on intermediate parameters that are generated for one that is different from 0 modulo n. It checks that values computed by several executions of the verification algorithm are the same, and checks that at least one mathematical relationship is verified. It performs a signature comparison final step to test equality between one of the intermediate parameters and a part of the digital signature. It triggers (S2) a fault attack countermeasure when at least one of the performed checks has failed.

6 Claims, 1 Drawing Sheet

(56) References Cited

U.S. PATENT DOCUMENTS

| | | | | | |
|---|---|---|---|---|---|
| 8,850,221 | B2 * | 9/2014 | Salgado | G06F 11/1004 | 713/189 |
| 9,426,141 | B2 * | 8/2016 | Mattsson | H04L 67/10 | |
| 9,571,289 | B2 * | 2/2017 | Jaffe | H04L 9/14 | |
| 9,734,322 | B2 * | 8/2017 | Brown | G06K 7/10366 | |
| 10,305,678 | B2 * | 5/2019 | Boulet | H04L 9/14 | |
| 11,888,974 | B1 * | 1/2024 | Griffin | H04L 9/3247 | |
| 2008/0104402 | A1 | 5/2008 | Gueron et al. | | |
| 2011/0126085 | A1 * | 5/2011 | Teglia | G06F 21/64 | 714/E11.024 |
| 2011/0138192 | A1 * | 6/2011 | Kocher | H04L 9/003 | 713/189 |
| 2013/0247194 | A1 * | 9/2013 | Jha | H04W 12/128 | 726/23 |
| 2015/0304337 | A1 * | 10/2015 | Nguyen-Tuong | G06F 21/51 | 726/1 |
| 2016/0072621 | A1 * | 3/2016 | Oshida | G06F 21/554 | 713/194 |
| 2016/0239365 | A1 * | 8/2016 | Schweer | G06F 21/77 | |
| 2016/0246984 | A1 * | 8/2016 | Wenzel | G06F 9/30145 | |
| 2017/0228562 | A1 * | 8/2017 | Guilley | G09C 1/00 | |
| 2018/0004953 | A1 * | 1/2018 | Smith, II | H04L 9/3268 | |
| 2019/0007219 | A1 * | 1/2019 | Ghosh | H04L 9/3252 | |
| 2022/0237287 | A1 * | 7/2022 | Vigilant | G06F 21/554 | |

OTHER PUBLICATIONS

Anonymous: "SM2 Digital Signature Algorithm", Feb. 14, 2014 (Feb. 14, 2014), XP055627331, Retrieved from the Internet: URL:https://tools.ietf.org/html/draft-shen-sm2-ecdsa-02 [retrieved on Sep. 30, 2019] Section 5.3.1 Section 5.3.2.

* cited by examiner

METHOD FOR SECURING AGAINST FAULT ATTACKS A VERIFICATION ALGORITHM OF A DIGITAL SIGNATURE OF A MESSAGE

FIELD OF THE INVENTION

The present invention relates to the field of signature schemes, and of associated cryptographic devices, and more particularly to a signature verification method resistant to fault attacks.

BACKGROUND OF THE INVENTION

Cryptographic algorithms are commonly used for ensuring the privacy of communications by encryption, for authentication or for generating a verifiable signature. When such a signature is generated for a given message, it may be used by a reader of the message to prove that the read message is genuine and to prove the identity of the issuer of the message.

In order to perform such a verification of a signature, computations must be performed in order to verify that one or more mathematical relationships involving at least a part of the signature and a public key of the issuer of the signature are verified.

The main problem of such a verification is its sensitivity to fault attacks. An attacker may disturb the verification process execution flow such that a forged signature is accepted by the verifier.

Verification algorithm usually comprise a signature comparison final step comprising a test of equality between a calculation parameter and a part of the digital signature to be verified. For example when verifying a signature (r,s) of a message e, produced using DSA algorithm, with a public key Q, it is verified in the final step that R=r with R=x-coordinate([U1]·G+[U2]Q) mod n with $U1=e\cdot s^{-1}$ mod n and $U2=r\cdot s^{-1}$ mod n with G an elliptic curve base point or an integer and n an integer.

Some solutions have been proposed in order to protect this final comparison step against fault attacks but the previous calculation steps of the verification process remain vulnerable to such fault attacks.

Consequently, there is a need for a digital signature verification method with an increased protection against fault attacks, able to resist fault attacks against other calculation steps than the signature comparison final step of the verification method.

SUMMARY OF THE INVENTION

For this purpose and according to a first aspect, this invention therefore relates to a method for securing against fault attacks a verification algorithm of a digital signature of a message e using a public key Q, said digital signature comprising a first part r and a second part s, and said algorithm being executed by a client device, wherein:

said verification of the digital signature comprises:

- generation steps of a plurality of intermediate parameters, and
- a signature comparison final step comprising a test of equality between one of said intermediate parameters and said digital signature first part, said method comprising, performed by said client device before said signature comparison final step:

- performing at least one check on said intermediate parameters among:
  - checking for at least one of said intermediate parameters that its value modulo n is different from 0, n being an integer,
  - checking that at least one mathematical relationship is verified by at least one intermediate parameter,
- when at least one of the performed checks has failed, triggering a fault attack countermeasure.

It enables the client device to detect a fault attack targeting one of the intermediate parameters computed during the signature verification process before its final step.

Said countermeasure may be among triggering an alarm, interrupting the verification algorithm execution, rebooting the client device.

By triggering such countermeasures, the client device prevents an attacker from taking advantage from a successful fault attack changing the value of an intermediate parameter.

Such generation steps of the verification of the digital signature of the message e with the public key Q may comprise:

- generating first and second intermediate parameters U1 and U2,
- generating a third intermediate parameter X based on said first and second intermediate parameters U1, U2 and on G, Q elliptic curve base points or integers,
- generating a fourth intermediate parameter x from said third intermediate parameter X,
- generating a fifth intermediate parameter R from said fourth intermediate parameter x, and said signature comparison final step may comprise checking equality between said fifth intermediate parameter and said digital signature first part and in case of equality, validating the digital signature (r,s) for the message e and the public key Q, said method according to the first aspect comprising:

- a. checking for at least one intermediate parameter among the first, second and fourth intermediate parameters U1, U2, x, that its value modulo n is different from 0, n being an integer,
- b. checking that values of at least one intermediate parameter among the first, second, fourth and fifth intermediate parameters U1, U2, x, R, computed by several executions of the verification algorithm, are the same,
- c. checking that at least one mathematical relationship between the first, second, fourth and/or fifth intermediate parameters U1, U2, x, R, is verified.

Each of said checks on said intermediate parameters is performed as soon as the intermediate parameters used as arguments of said check become available.

It enables the client device to detect a fault attack as soon as it occurs, without waiting for the end of the execution of the verification algorithm.

According to a first embodiment wherein the digital signature verification algorithm is a DSA algorithm, comprising, n being an integer, G, Q being elliptic curve points:

- generating the first intermediate parameter U1 such that: $U1=e\cdot s^{-1}$ mod n,
- generating the second intermediate parameter U2 such that: $U2=r\cdot s^{-1}$ mod n,
- generating the third intermediate parameter X such that X=[U1]·G+[U2]·Q,
- generating the fourth intermediate parameter x such that: x=x-coordinate(X) mod n,
- generating the fifth intermediate parameter R such that R=x, the method according to the first aspect comprises:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, checking that a mathematical relationship between {U2, r, s, n} is satisfied, checking that a mathematical relationship between {U1, U2, e, r, n} is satisfied.

According to a second embodiment, wherein the digital signature verification algorithm is a DSA algorithm, G, Q, p, n being integers, comprising:

generating the first intermediate parameter U1 such that: $U1=e\cdot s^{-1}$ mod n, generating the second intermediate parameter U2 such that: $U2=r\cdot s^{-1}$ mod n, generating the third intermediate parameter X such that $X=G^{u1}.\ Q^{u2}$ mod p, generating the fourth intermediate parameter x such that: x=X mod n, generating the fifth intermediate parameter R such that R=x, the method according to the first aspect comprises:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, checking that a mathematical relationship between {U2, r, s, n} is satisfied, checking that a mathematical relationship between {U1, U2, e, r, n} is satisfied.

The check of a mathematical relationship may be among:

checking that $U1\cdot s$ mod n=e, checking that $U2\cdot s$ mod n=r, checking that $U1=U2\cdot e\cdot r^{-1}$ mod n.

According to a third embodiment wherein the digital signature verification algorithm is a GOST 34.11.12 algorithm and said generation steps of the digital signature verification comprise, n being an integer, G, Q being elliptic curve points:

generating a sixth intermediate parameter v such that $v=e^{-1}$ mod n, generating the first intermediate parameter U1 such that U1=sv mod n, generating the second intermediate parameter U2 such that U2=−rv mod n, generating the third intermediate parameter X such that $X=[U1]\cdot G+[U2]\cdot Q$, generating the fourth intermediate parameter x such that x=x-coordinate(X) mod n, generating the fifth intermediate parameter R such that R=x, said method according to the first aspect comprises:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, checking that a mathematical relationship between {U2, r, e, n} is satisfied, checking that a mathematical relationship between {U1, U2, r, s, n} is satisfied.

The check of a mathematical relationship may be among:

checking that $U1\cdot e$ mod n=s, checking that $-U2\cdot e$ mod n=r, checking that $U1=U2\cdot s\cdot(-1/r)$ mod n.

According to a fourth embodiment wherein the digital signature verification algorithm is a SM2 algorithm and said generation steps of the digital signature verification comprise, n being an integer, G, Q being elliptic curve points:

generating a seventh intermediate parameter t such that t=r+s mod n with r and s integers in [1, n−1], generating a third intermediate parameter X such that $X=[s]\cdot G+[t]\cdot Q$, G being a base point of an elliptic curve, generating a fourth intermediate parameter x such that x=x-coordinate(X) mod n, generating a fifth intermediate parameter R such that R=x+e mod n, and the method according to the first aspect comprises:

a. checking that the fourth intermediate parameter x and/or R-e modulo n is different from zero, b. computing k times the fourth intermediate parameter x and/or the fifth intermediate parameter R and checking that the results of these computations are the same, with k an integer >1, c. checking that at least one mathematical relationship between the third, fourth, fifth intermediate parameters X, x, R and said message e, is verified comprising:

checking that R−x mod n=e, checking that the resulting point X with x-coordinate x lies on the elliptic curve.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a client device configured for securing against fault attacks a verification algorithm of a digital signature of a message using a public key and comprising a processor, a memory and an input-output interface configured for performing the steps of the method according to the first aspect.

According to a fourth aspect, this invention therefore relates also to a smartcard or a secure element comprising the client device according to the third aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

The invention aims at securing against fault attacks a verification algorithm of a digital signature generated using a public-private key pair signature algorithm. The method according to the invention aims at securing such a verification algorithm when it is executed by a client device for verifying the signature of a message e, using the public key Q of the public-private key pair used by the signature scheme. Such a signature usually comprises a first part r and a second part s. The signature to be verified is therefore written (r,s).

Such a verification algorithm of a signature (r,s) usually comprises several generation steps of a plurality of intermediate parameters, and a signature comparison final step comprising a test of equality between one of said intermediate parameters and said digital signature first part r. The main idea of the method according to the invention is to perform additional tests on the generated intermediate parameters, in addition to the test performed at the signature comparison final step, in order to detect any attempt by an attacker to force the value of one of these intermediate parameters and therefore to have an invalid signature accepted by the verification algorithm.

Figure 1:
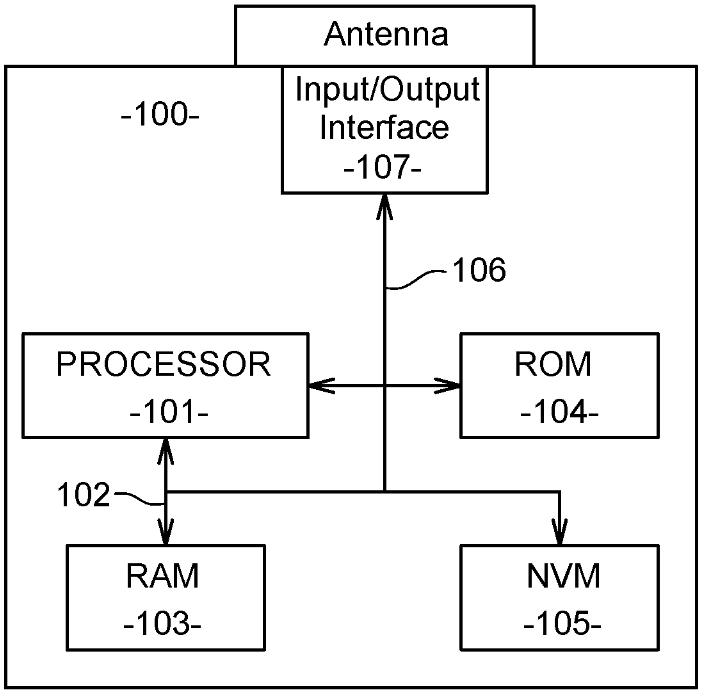
FIG. 1 is a schematic illustration of a client device according to an embodiment of the present invention.

FIG. 1 is a schematic illustration of a client device 100. The client device 100 may include a processor 101 connected via a bus 102 to a random access memory (RAM) 103, a read-only memory (ROM) 104, and/or a non-volatile memory (NVM) 105. The client device 100 further includes a connector 106 connected to the processor and by which the client device 101 may be connected to an antenna. Such an antenna may be used to connect the client device 101 to various forms of wireless networks, e.g., wide-area networks, WiFi networks, or mobile telephony networks. Alternatively, the client device 101 may connect to networks via wired network connections such as Ethernet. The client device may also include input/output means 107 providing interfaces to the user of the client device, such as one or more screens, loudspeakers, a mouse, tactile surfaces, a keyboard etc.

Such a client device may be or may be included in a secure element or a smartcard.

Figure 2:
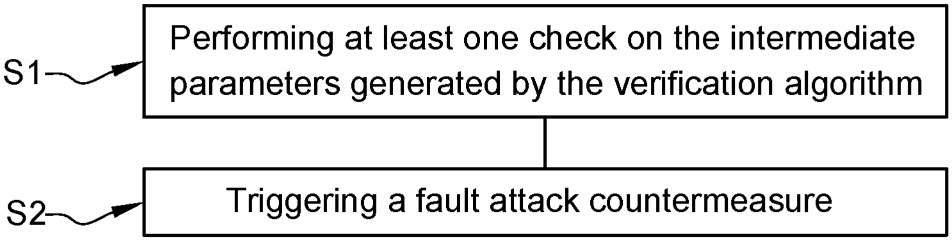
FIG. 2 illustrates schematically a method for securing against fault attacks a verification algorithm of a digital signature of a message using a public key according to an embodiment of the present invention.

The following paragraphs describe the steps of a method for securing against fault attacks a verification algorithm of a digital signature of a message e using a public key Q, said algorithm being executed by the client device 100 according to a first aspect of the invention as depicted on FIG. 2.

During a first checking step S1, the client device performs at least one check on the intermediate parameters generated by the verification algorithm. The checks performed may be chosen among the following ones:

- An attacker may try to force the value of at least one intermediate parameter to zero in order to make the final test succeed. In order to catch such an attack, the client device may check for at least one of said intermediate parameters that its value modulo n is different from 0, n being an integer;
- When the verified signature is valid, the generated intermediate parameters shall verify some mathematical relationship so that the final test of the verification algorithm succeeds. Consequently, in order to detect a fault attack, the client device may check that at least one particular mathematical relationship is verified by at least one intermediate parameter.

Optionally, when the verification algorithm is executed several times for the same signature, each intermediate parameter should keep the same value over all executions, since the verification algorithm is deterministic. When an attacker performs a fault injection attack modifying the value of an intermediate parameter, this value is modified only for the current execution of the verification algorithm. Consequently, in order to detect such a modification of a value of an intermediate parameter, the client device may further check that values of at least one of said intermediate parameters, computed by several executions of the verification algorithm, are the same.

During a second checking step S2, when at least one of the checks performed at the first checking steps has failed, the client device triggers a fault attack countermeasure.

Depending on the kind of test performed during the first checking step S1, the first and second checking step may be performed during the execution of the verification algorithm, as soon as the intermediate parameters needed for the checking have been computed, or they may be performed at the end of the execution of the verification algorithm, before the result of the signature verification is returned to the main process that ordered it. When several checks are performed during the first checking step S1, each of the checks on the intermediate parameters may be performed as soon as the intermediate parameters used as arguments of this check become available.

During the second checking step S2, various countermeasures may be triggered when a check has failed. The client device may trigger an alarm, in order to warn a user or administrator that a fault attack may have occurred during the execution of the verification algorithm. The client device may also trigger more coercive countermeasures such as interrupting the execution of the verification algorithm, therefore blocking a positive verification result from being transmitted to the main process that ordered the verification, or such as rebooting the client device in order to prevent the attacker from benefiting from its attack and to force a new verification of the signature.

The following paragraphs describe several embodiments corresponding to different signature schemes.

In a first family of embodiments, the generation of the intermediate parameters comprises:

- generating first and second intermediate parameters U1 and U2,
- generating a third intermediate parameter X based on said first and second intermediate parameters U1, U2 and on G, Q elliptic curve base points or integers,
- generating a fourth intermediate parameter x from said third intermediate parameter X,
- generating a fifth intermediate parameter R from said fourth intermediate parameter x.

The signature comparison final step then comprises checking the equality between said fifth intermediate parameter and said digital signature first part r, i.e. checking that R=r.

In case of equality, the client device validates the digital signature (r,$) for the message e and the public key Q.

The first checking step S1 may then comprise one or more of the following tests:

a. checking for at least one intermediate parameter among the first, second and fourth intermediate parameters U1, U2, x, that its value modulo n is different from 0, n being an integer, b. checking that values of at least one intermediate parameter among the first, second, fourth and fifth intermediate parameters U1, U2, x, R, computed by several executions of the verification algorithm, are the same, c. checking that at least one mathematical relationship between the first, second, fourth and/or fifth intermediate parameters U1, U2, x, R, is verified.

In a first embodiment of this family of embodiments, the signature scheme used for generating and verifying the signature (r,s) is a DSA scheme. In such an embodiment:

{G, p, n} is the Finite Field Cryptography domain with G an integer, p and n prime integers such that $G^n$ mod p=1. $Q=G^d$ mod p, an integer included between 1 and p−1, where d is the user's private key, Q is the user's public key;

The signature is composed of:

r=($G^k$ mod p) mod n, with k a random integer in [1, n−1], $s=k^{-1}(e+dr)$ mod n.

The generation of the intermediate parameters then comprises:

generating first and second intermediate parameters U1 and U2, such that: $U1=e\cdot s^{-1}$ mod n, $U2=r\cdot s^{-1}$ mod n.

generating a third intermediate parameter X, such that $X=G^{u1}\cdot Q^{u2}$ mod p, generating a fourth intermediate parameter x such that x=X mod n, generating a fifth intermediate parameter R such that R=x, The first checking step S1 may then comprise one or more of the following tests:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, such as U1·s mod n=e, checking that a mathematical relationship between {U2, r, s, n} is satisfied, such as U2·s mod n=r, checking that a mathematical relationship between {U1, U2, e, r, n} is satisfied, such as $U1=U2\cdot e\cdot r^{-1}$ mod n.

These mathematical equations to be checked are given as example and should not be considered as limitative. Other checks would be possible as it is well known by a man skilled in the art.

In a second embodiment of this family of embodiments, the signature scheme used for generating and verifying the signature (r,s) is a ECDSA scheme. In such an embodiment:

{G, a, b, p, n} is the Elliptic Curve Cryptography group with:

y^2=x^3+a·x+b mod p, the equation of the elliptic curve defined over GF(p), p a prime integer;

Considering the point multiplication law on this curve, G is the group base point, and n is the prime order of G, [n]·G=infinity point. [n]·G denotes the point multiplication of G with the scalar n;

The public key Q is an elliptic curve point define by Q=[d]·G, where d the private key is an integer included in [1,n−1] and G is the base point.

The signature is composed of:

r=x-coordinate([k]·G) mod n, with k a random integer in [1, n−1], $s=k^{-1}(e+dr)$ mod n.

For the verification, the generation of the intermediate parameters then comprises:

generating first and second intermediate parameters U1 and U2, such that: $U1=e\cdot s^{-1}$ mod n, $U2=r\cdot s^{-1}$ mod n, generating a third intermediate parameter X, such that X=[U1]·G+[U2]·Q, generating a fourth intermediate parameter x such that x=x-coordinate(X) mod n, generating a fifth intermediate parameter R such that R=x.

The first checking step S1 may then comprise one or more of the following tests:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, such as U1·s mod n=e, checking that a mathematical relationship between {U2, r, s, n} is satisfied, such as U2·s mod n=r, checking that a mathematical relationship between {U1, U2, e, r, n} is satisfied, such as $U1=U2\cdot e\cdot r^{-1}$ mod n.

These mathematical equations to be checked are given as example and should not be considered as limitative. Other checks would be possible as it is well known by a man skilled in the art.

A third embodiment of this family of embodiments is the digital signature and verification algorithms is a GOST 34.11.12. In such an embodiment:

{G, a, b, p, n} is the Elliptic Curve Cryptography group with:

y^2=x^3 a·x+b mod p, the equation of the elliptic curve defined over GF(p), p a prime integer;

Considering the point multiplication law on this curve, G is the group base point, and n is the prime order of G, [n]·G=infinity point. [n]·G denotes the point multiplication of G with the scalar n;

The public key Q is an elliptic curve point define by Q=[d]·G, where d the private key is an integer included in [1,n−1] and G is the base point.

The signature is composed of:

r=x-coordinate([k]·G) mod n, with k a random integer in [1,n−1], s=(ke+dr) mod n.

For the verification, the generation of the intermediate parameters then comprises:

generating a sixth intermediate parameter v such that $v=e^{-1}$ mod n, generating the first intermediate parameter U1 such that U1=sv mod n, generating the second intermediate parameter U2 such that U2=−rv mod n, generating the third intermediate parameter X such that X=[U1]·G+[U2]·Q, generating the fourth intermediate parameter x such that x=x-coordinate(X) mod n, generating the fifth intermediate parameter R such that R=x, The first checking step S1 may then comprise one or more of the following tests:

a. checking that the first intermediate parameter U1 and/or the second intermediate parameter U2 modulo n is different from zero, b. computing k times the first intermediate parameter U1 and/or the second intermediate parameter U2 and checking that the results of these computations are the same, with k an integer >1, c. performing at least one check of a mathematical relationship among:

checking that a mathematical relationship between {U1, e, s, n} is satisfied, such as U1·e mod n=s, checking that a mathematical relationship between {U2, r, e, n} is satisfied, such as −U2·e mod n=r, checking that a mathematical relationship between {U1, U2, r, s, n} is satisfied, such as U1=U2·s·(−1/r) mod n.

These mathematical equations to be checked are given as example and should not be considered as limitative. Other checks would be possible as it is well known by a man skilled in the art.

A last embodiment, which does not belong to the first family of embodiments, the digital signature verification algorithm is a SM2 algorithm. In such an embodiment:

{G, a, b, p, n} is the Elliptic Curve Cryptography group with:

y^2=x^3+a·x+b mod p, the equation of the elliptic curve defined over GF(p), p a prime integer;

Considering the point multiplication law on this curve, G is the group base point, and n is the prime order of G, [n]·G=infinity point. [n]·G denotes the point multiplication of G with the scalar n;

The public key Q is an elliptic curve point define by Q=[d]·G, where d the private key is an integer included in [1, n−1] and G is the base point.

The signature is composed of:

r=(e+x-coordinate([k]·G)) mod n, with k a random integer in [1, n−1], s=$(1+d)^{-1}$(k−rd) mod n.

For the verification, the generation of the intermediate parameters then comprises:

generating a seventh intermediate parameter t such that t=r+s mod n with r and s integers in [1, n−1], generating a third intermediate parameter X such that X=[s]·G+[t]·Q, G being a base point of an elliptic curve, generating a fourth intermediate parameter x such that x=x-coordinate(X) mod n, generating a fifth intermediate parameter R such that R=x+e mod n.

The first checking step S1 may then comprise one or more of the following tests:

a. checking that the fourth intermediate parameter x and/or R-e modulo n is different from zero, b. computing k times the fourth intermediate parameter x and/or the fifth intermediate parameter R and checking that the results of these computations are the same, with k an integer >1, c. checking that R-x mod n=e and/or checking that the resulting point X with x-coordinate x lies on the elliptic curve.

These mathematical equations to be checked are given as example and should not be considered as limitative. Other checks would be possible as it is well known by a man skilled in the art.

In all the embodiments described above, all the steps of checking that an intermediate parameter modulo n is different from 0 may just consist in checking that this intermediate parameter is different from the value "0" or that it is not equal to a multiple of n.

According to a second aspect, the invention is also related to a computer program product directly loadable into the memory of at least one computer, comprising software code instructions for performing the steps of the method according to the first aspect as described above when said product is run on the computer.

According to a third aspect, the invention is also related to a client device 100 configured for securing against fault attacks a verification algorithm of a digital signature of a message e using a public key Q and comprising a processor 101, a memory 103, 104, 105 and an input-output interface 107 configured for performing the steps of the method according to the first aspect as described here above. Such a client device may be comprised in a smartcard or a secure element.

As a result, the client device is able to detect a fault attack targeting one of the intermediate parameters computed during the signature verification process before its final step; and to trigger the appropriate countermeasure when such an attack is detected.

The invention claimed is:

1. A method for operating a client device to secure the client device against fault attacks while the client device executes a verification algorithm of a digital signature of a message (e) using a public key (Q), wherein said digital signature comprises a first part (r) and a second part(s), and wherein the digital signature verification algorithm is a DSA (Digital Signature Algorithm) algorithm, n being an integer, G, Q being elliptic curve points, wherein the client device comprises a processor and memory with software code instructions that execute on the processor to perform:

generation steps of a plurality of intermediate parameters comprising:

generating the first intermediate parameter U1=e·$s^{-1}$ mod n;

generating the second intermediate parameter U2=r·$s^{-1}$ mod n;

generating the third intermediate parameter X=[U1]·G+ [U2]·Q;

generating the fourth intermediate parameter x=x-coordinate(X) mod n;

generating the fifth intermediate parameter R such that R=x;

a signature comparison final step comprising a test of equality between said fifth intermediate parameter and said digital signature first part (r), and in case of equality, validating the digital signature (r, s) for the message e and the public key Q, and wherein said method comprises, determining a possible fault attack against the client device by said client device before said signature comparison final step:

checking that the first intermediate parameter U1 as generated by the client device and/or the second intermediate parameter U2 as generated by the client device is different from zero modulo n;

computing k times the first intermediate parameter U1 as generated by the client device and/or the second intermediate parameter U2 as generated by the client device and checking that the results of these computations are identical, with k an integer >1;

performing at least one check of a mathematical relationship among:

checking that a mathematical relationship between {U1, e, s, n} as generated by the client device is satisfied;

checking that a mathematical relationship between {U2, r, s, n} as generated by the client device is satisfied;

checking that a mathematical relationship between {U1, U2, e, r, n} as generated by the client device is satisfied; and triggering a fault attack countermeasure comprising at least one selected from a group consisting of interrupting the verification algorithm execution, and rebooting the client device, when at least one of the performed checks has failed thus indicating a fault attack against the client device.

2. A method for operating a client device to secure the client device against fault attacks while the client device executes a verification algorithm of a digital signature of a message (e) using a public key (Q), wherein said digital signature comprises a first part (r) and a second part(s), and wherein the digital signature verification algorithm is a DSA (Digital Signature Algorithm) algorithm, G, Q, p, n being integers, wherein the client device comprises a processor and memory with software code instructions that execute on the processor to perform:

generation steps of a plurality of intermediate parameters comprising:

generating the first intermediate parameter U1 such that: $U1=e\cdot s^{-1}$ mod n;

generating the second intermediate parameter U2 such that: $U2=r\cdot s^{-1}$ mod n;

generating the third intermediate parameter X such that $X=G^{u1}\cdot Q^{u2}$ mod p;

generating the fourth intermediate parameter x such that: x=X mod n;

generating the fifth intermediate parameter R such that R=x;

a signature comparison final step comprising a test of equality between said fifth intermediate parameter and said digital signature first part (r), and in case of equality, validating the digital signature (r, s) for the message e and the public key Q, and wherein said method comprises, determining a fault attack against the client device by performing by said client device before said signature comparison final step:

checking that the first intermediate parameter U1 and/or the second intermediate parameter U2 as generated by the client device is different from zero modulo n;

computing k times the first intermediate parameter U1 as generated by the client device and/or the second intermediate parameter U2 as generated by the client device and checking that the results of these computations are identical, with k an integer >1;

performing at least one check of a mathematical relationship among:

checking that a mathematical relationship between {U1, e, s, n} as generated by the client device is satisfied;

checking that a mathematical relationship between {U2, r, s, n} as generated by the client device is satisfied;

checking that a mathematical relationship between {U1, U2, e, r, n} as generated by the client device is satisfied;

triggering a fault attack countermeasure, comprising at least one selected among a group consisting of interrupting the verification algorithm execution, and rebooting the client device, when at least one of the performed checks has failed thus indicating a fault attack against the client device.

3. The method of claim 1, wherein the checking of said mathematical relationship is among mathematical equations of:

$$\text{checking that } U1\cdot s \bmod n=e,$$

$$\text{checking that } U2\cdot s \bmod n=r, \text{ and}$$

$$\text{checking that } U1=U2\cdot e\cdot r^{-1} \bmod n.$$

4. A method for operating a client device to secure the client device against fault attacks while the client device executes a verification algorithm of a digital signature of a message (e) using a public key (Q), wherein said digital signature comprises a first part (r) and a second part(s), and wherein the digital signature verification algorithm is a GOST 34.11.12 algorithm, n being an integer, G, Q being elliptic curve points, wherein the client device comprises a processor and memory with software code instructions that execute on the processor to perform:

generation steps of a plurality of intermediate parameters comprising generating a sixth intermediate parameter v such that $v=e^{-1}$ mod n;

generating the first intermediate parameter U1 such that U1=sv mod n;

generating the second intermediate parameter U2 such that U2=−rv mod n;

generating the third intermediate parameter X such that X=[U1]·G+ [U2]·Q;

generating the fourth intermediate parameter x such that x=x-coordinate (X) mod n;

generating the fifth intermediate parameter R such that R=x;

a signature comparison final step comprising a test of equality between said fifth intermediate parameter and said digital signature first part (r), and in case of equality, validating the digital signature (r, s) for the message e and the public key Q, said method comprising determining a fault attack against the client device by said client device before said signature comparison final step:

checking that the first intermediate parameter U1 as generated by the client device and/or the second intermediate parameter U2 as generated by the client device is different from zero modulo n, computing k times the first intermediate parameter U1 as generated by the client device and/or the second intermediate parameter U2 as generated by the client device and checking that the results of these computations are identical, with k an integer >1, performing at least one check of a mathematical relationship among:

checking that a mathematical relationship between {U1, e, s, n} generated by the client device is satisfied;

checking that a mathematical relationship between {U2, r, e, n} as generated by the client device is satisfied;

checking that a mathematical relationship between {U1, U2, r, s, n} as generated by the client device is satisfied;

triggering a fault attack countermeasure, comprising at least one selected from a group consisting of among interrupting the verification algorithm execution, and rebooting the client device, when at least one of the performed checks has failed thus indicating a fault attack against the client device.

5. The method of claim 4, wherein the mathematical relationship is one among mathematical equations of:

$$U1\cdot e \bmod n=s,$$

$$-U2\cdot e \bmod n=r, \text{ and}$$

$$U1=U2\cdot s\cdot(-1/r) \bmod n,$$

wherein said satisfaction is the mathematical equality denoted by the =sign of a respective equation, and wherein said checking is a mathematical calculation of the respective equation.

6. A method for operating a client device to secure the client device against fault attacks while the client device executes a verification algorithm of a digital signature of a message (e) using a public key (Q), wherein said digital signature comprises a first part (r) and a second part(s), and wherein the digital signature verification algorithm is a SM2 (GM/T 0003.3-2012) algorithm and comprises, n being an integer, G, Q being elliptic curve points, wherein the client device comprises a processor and memory with software code instructions that execute on the processor to perform:

generation steps of a plurality of intermediate parameters comprising:

generating a seventh intermediate parameter t such that t=r+s mod n with r and s integers in [1, n−1];

generating a third intermediate parameter X such that X=[s]·G+[t]·Q, G being a base point of an elliptic curve;

generating a fourth intermediate parameter x such that x=x-coordinate (X) mod n;

generating a fifth intermediate parameter R such that R=x+e mod n;

a signature comparison final step comprising a test of equality between said fifth intermediate parameter and said digital signature first part (r), and in case of equality, validating the digital signature (r, s) for the message e and the public key Q;

said method comprising determining a fault attack against the client device by said client device before said signature comparison final step performing:

checking that the fourth intermediate parameter x and/or R-e as generated by the client device is different from zero modulo n;

computing k times the fourth intermediate parameter x as generated by the client device and/or the fifth intermediate parameter R as generated by the client device and checking that the results of these computations are identical, with k an integer >1;

checking that at least one mathematical relationship between the third, fourth, fifth intermediate parameters X, x, R and said message e as generated by the client device, is verified comprising:

checking that R−x mod n=e;

checking that the resulting point X with x-coordinate x lies on the elliptic curve;

triggering a fault attack countermeasure, comprising at least one selected from a group consisting of among interrupting the verification algorithm execution, and rebooting the client device, when at least one of the performed checks has failed thus indicating a fault attack against the client device.

* * * * *